(12) United States Patent
Ho et al.

(10) Patent No.: US 8,446,546 B2
(45) Date of Patent: May 21, 2013

(54) BACKLIGHT MODULE WITH BENT REFLECTOR SHEET AND DISPLAY PANEL DEVICE

(75) Inventors: Ya-Ting Ho, Hsin-Chu (TW); Chi-Chih Chu, Hsin-Chu (TW); Keng-Ju Liu, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 643 days.

(21) Appl. No.: 12/416,302

(22) Filed: Apr. 1, 2009

(65) Prior Publication Data
US 2010/0014015 A1    Jan. 21, 2010

(30) Foreign Application Priority Data
Jul. 21, 2008    (TW) ................. 97127716 A

(51) Int. Cl.
| G02F 1/1335 | (2006.01) |
| G02F 1/1333 | (2006.01) |
| G09F 13/04 | (2006.01) |
| G09F 13/08 | (2006.01) |
| F21V 21/00 | (2006.01) |
| F21V 7/04 | (2006.01) |

(52) U.S. Cl.
USPC ......... 349/65; 349/58; 362/97.1; 362/217.11; 362/217.15; 362/633; 362/634

(58) Field of Classification Search
USPC ........... 349/58, 65; 362/97.1, 217.11, 217.15, 362/633, 634
See application file for complete search history.

(56) References Cited

U.S. PATENT DOCUMENTS

| 5,990,989 A * | 11/1999 | Ozawa ............................. 349/61 |
| 6,502,945 B2 | 1/2003 | Kim et al. |
| 6,882,382 B2 * | 4/2005 | Son ................................. 349/65 |
| 7,134,780 B2 * | 11/2006 | Tsai .............................. 362/633 |
| 7,591,579 B2 * | 9/2009 | Yeom ............................. 362/613 |

(Continued)

FOREIGN PATENT DOCUMENTS

| TW | 327036 | 1/2006 |
| WO | WO2008/007487 A1 * | 1/2008 |

OTHER PUBLICATIONS

Chinese language Office Action dated Jun. 19, 2009.

(Continued)

*Primary Examiner* — Mark Robinson
*Assistant Examiner* — Robert Tavlykaev
(74) *Attorney, Agent, or Firm* — McClure, Qualey & Rodack, LLP

(57) ABSTRACT

A backlight module and a display panel device using the same are provided. The backlight module includes a light source module, an open frame, and a reflector sheet. The open frame is disposed around the light source module and has a first free-end and a second free-end. A space interval exists between the first and second free-ends. The reflector sheet is disposed on a rear side of the light source module and has a body and a sidewall. The sidewall corresponds to the space interval between the first and second free-ends and extends over the light source module. The display panel further includes a liquid crystal display panel (LCD panel) on the light source module and a front frame which is disposed on the LCD panel enclosing a lateral side of the LCD panel. The sidewall of the reflector sheet extends between the lateral side of the LCD panel and the front frame to provide insulation.

16 Claims, 13 Drawing Sheets

U.S. PATENT DOCUMENTS

| | | | | |
|---|---|---|---|---|
| 7,724,317 B2 * | 5/2010 | Kim et al. | | 349/58 |
| 2006/0290833 A1 * | 12/2006 | Park | | 349/58 |
| 2007/0047265 A1 * | 3/2007 | Kang et al. | | 362/634 |
| 2007/0097284 A1 * | 5/2007 | Ho et al. | | 349/58 |

OTHER PUBLICATIONS

English language translation of abstract of TW 327036, Jan. 2006.

\* cited by examiner

BACKLIGHT MODULE WITH BENT REFLECTOR SHEET AND DISPLAY PANEL DEVICE

This application claims the priority based on a Taiwanese Patent Application No. 097127716, filed on Jul. 21, 2008, the disclosure of which is incorporated herein by reference in its entirety.

BACKGROUND OF THE INVENTION

1. Field of the Invention

This invention relates to a backlight module and a panel display device using the backlight module; more particularly, this invention relates to a design that can reduce the overall size of the backlight module and the panel display device using the same.

2. Description of the Prior Art

Due to the thinness, lightness, portability of liquid crystal display (LCD) panels, and low radiation comparing to cathode ray tube (CRT) displays, the demand for LCDs has increased rapidly in recent years. Especially, the backlight module is one of the essential components of the liquid crystal display. With the improvement of the liquid crystal display technology, the backlight module is further developed for marketing purposes, such as thinness, high brightness, and low cost. In order to maintain the competitiveness of liquid crystal displays in the market, how to develop and design better backlight modules has become an important issue.

FIG. 1 schematically illustrates a conventional liquid crystal display device. As shown in FIG. 1, the liquid crystal display device includes a backlight module, a liquid crystal display panel 70, and a front frame 90 disposed on the backlight module. The backlight module includes a back plate 20, a plastic frame 30, a light source module 10, a reflector sheet 50, and an optical film 40. The back plate 20 is disposed at the bottom of the backlight module and the plastic frame 30 is disposed on the back plate 20 for fixing the light source module 10 and the optical film 40. The reflector sheet 50 is disposed at the bottom of the light source module 10 for reflecting the light leaking out from the bottom of the light source module 10. The light source modules 10 commonly used are light emitting diode (LED) light sources or lamp tube light sources. However, due to the tendency of miniaturization, smaller backlight modules usually use LEDs as the light sources and cooperate with a light guide plate to serve as an edge type backlight source. The optical film 40 includes a diffuser, a brightness enhancement film, or other films capable of adjusting the light from the light source module 10 to achieve the above design requirements.

In this design, the plastic frame 30 is designed to completely surround the light source module 10 to fix the light source module 10 and reflects leakage light from the lateral side. Moreover, the plastic frame 30 can also extend between the liquid crystal display panel 70 and the front frame 90 to avoid possible short circuit caused by the contact between the liquid crystal display 70 and the front frame 90. However, in the conventional design, because the thickness of the plastic frame 30 can not be reduced, the overall size of the display device is increased, resulting in the failure of meeting the miniaturization requirement.

SUMMARY OF THE INVENTION

An object of this invention is to provide a backlight module and a panel display device using the same, which has a smaller product volume.

An object of this invention is to provide a backlight module and a panel display device using the same, which has the advantage of saving the material cost.

In one embodiment, a backlight module includes a light source module, an open frame, and a reflector sheet. The open frame is disposed around lateral sides of the light source module. Moreover, a first free-end and a second free-end are formed on two outmost ends of the open frame, respectively. The open frame is formed with a space interval between the first free-end and the second free-end. Each part of the open frame is co-planar. Moreover, the space interval between the first free-end and the second free-end extends on the plane. In other words, an extension direction of the space interval between the first free-end and the second free-end is co-planar with the open frame.

The reflector sheet is disposed on a rear side of the light source module and has a body and a sidewall. The body is located on the rear side of the light source module, while the sidewall corresponds to the space interval between the first free-end and the second free-end and is bended from one end of the body to extend over the light source module. With this design, because a part of the frame on one side is eliminated, the size of the open frame can be reduced and the material cost of the frame can be saved. Moreover, the employment of the sidewall of the reflector sheet can provide certain functions of the frame that is originally provided by the eliminated part between the first free-end and the second free-end, such as insulation effect.

In another embodiment, a panel display device includes the backlight module described above, a liquid crystal display panel, and a front frame. The liquid crystal display panel is disposed on the light source module and supported by the open frame. The front frame encloses the liquid crystal display panel and exposes a display area of the liquid crystal display panel to display images. The front frame surrounds the lateral side of the liquid crystal display panel to protect the liquid crystal display panel and the backlight module. The sidewall of the reflector sheet extends between the lateral side of the liquid crystal display panel and the front frame to provide insulation between the liquid crystal display panel and the front frame. With this design, the insulation effect that is originally provided by the backlight module frame can now be provided by the reflector sheet, so that short circuit caused by direct contact between the liquid crystal display panel and the front frame can be avoided. Therefore, the open frame design can be used to reduce the overall size and save the material cost.

DETAILED DESCRIPTION OF THE PREFERRED EMBODIMENT

This invention provides a backlight module and a reflector sheet therein. In a preferred embodiment, the backlight module is provided for the panel display device. However, in another embodiment, the backlight module can be provided for computer keyboards, mobile phone pads, billboards, and other devices in need of flat panel light sources. This invention further provides a panel display device using the backlight module. In a preferred embodiment, the panel display device of this invention includes a liquid crystal display device and can be provided for various electronic devices, such as liquid crystal display television, monitors of personal computers and laptop computers, and liquid crystal display screens of mobile phones and digital cameras.

Figure 1:
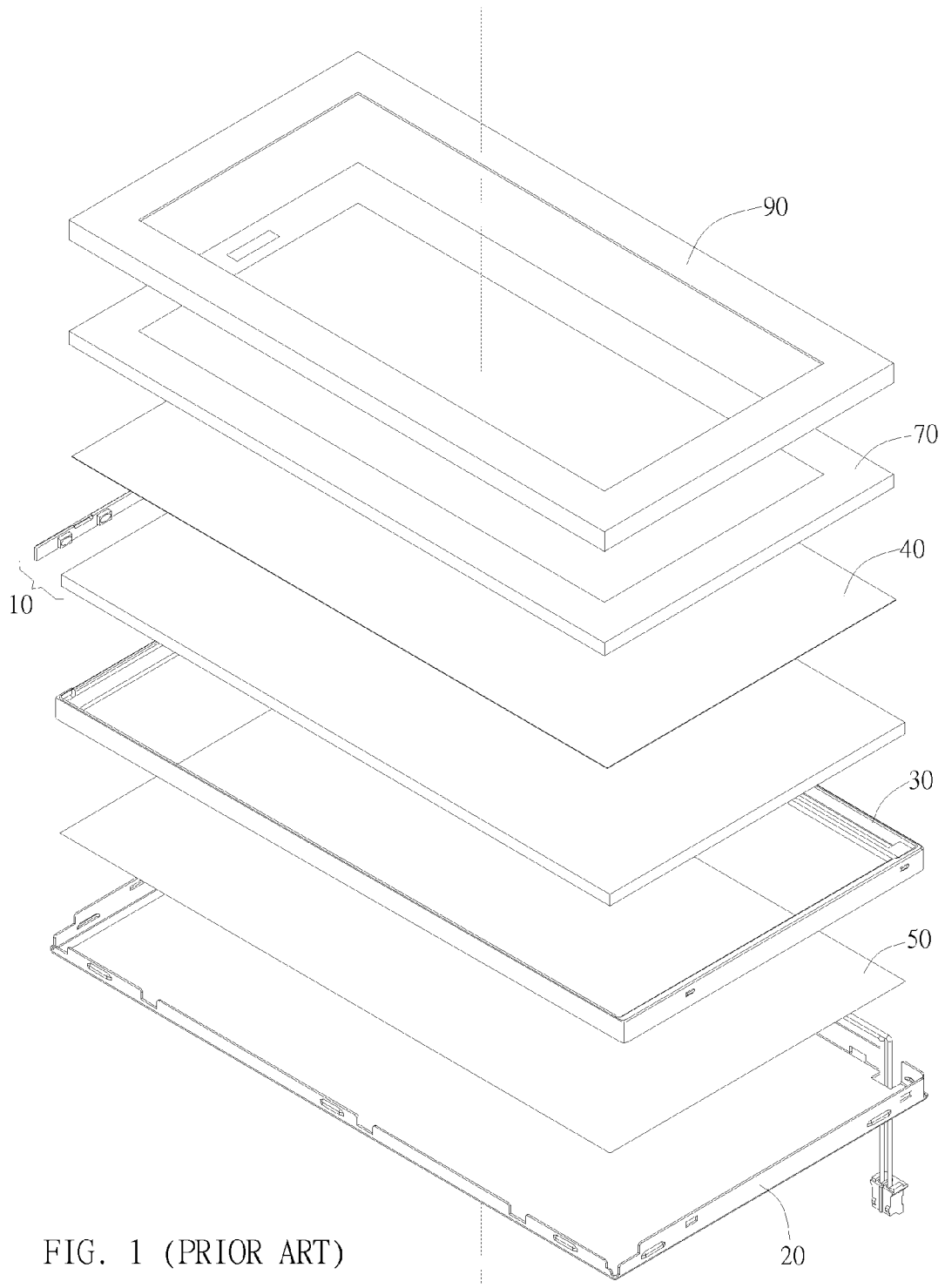
FIG. 1 schematically illustrates a conventional liquid crystal display device.
Figure 2:
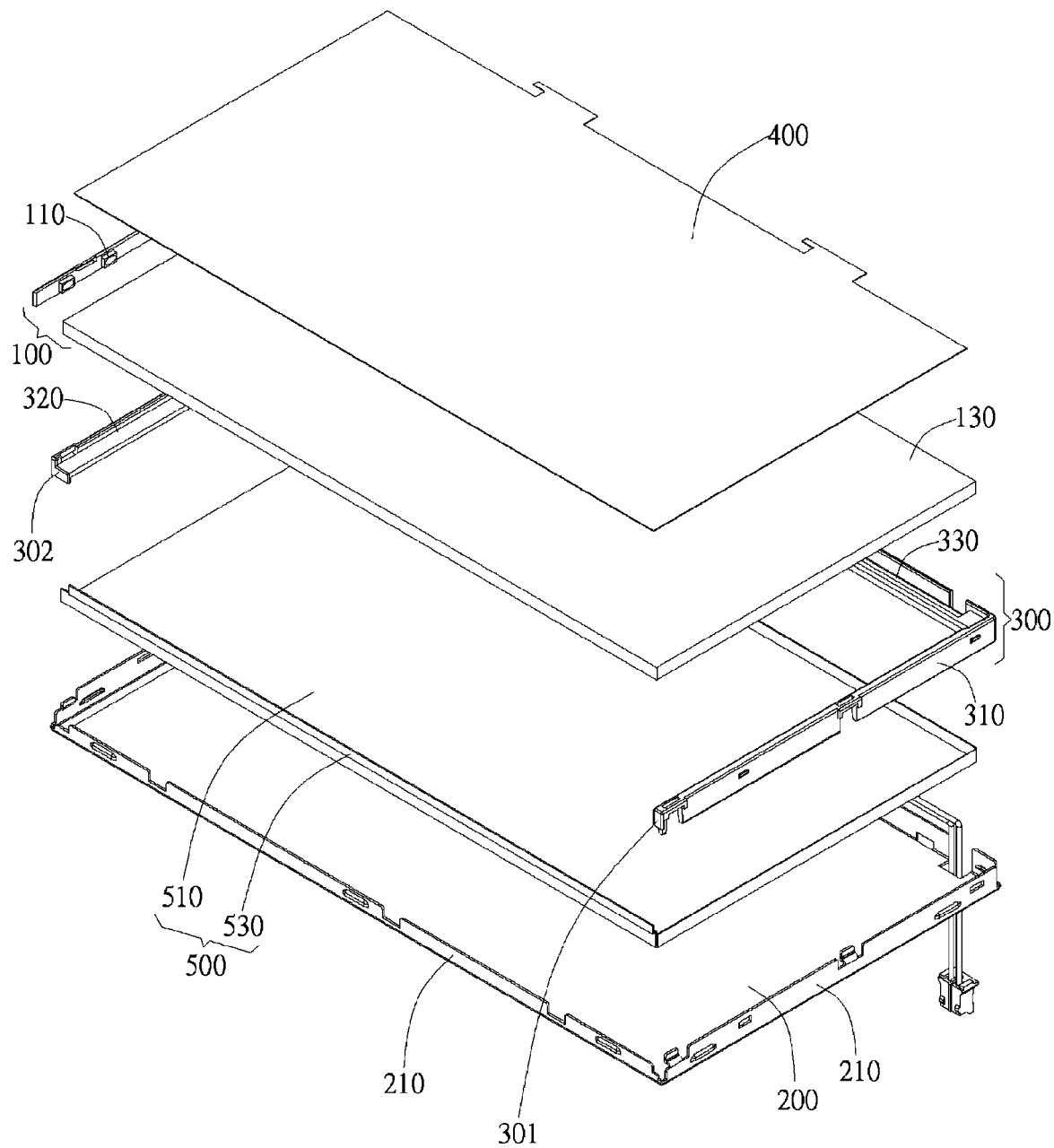
FIG. 2 is an exploded view of an embodiment of a backlight module of this invention.

As shown in FIG. 2, the backlight module of this invention includes a light source module 100, an open frame 300, and a reflector sheet 500. The light source module 100 can include direct type, edge type, and other different designs. The light source module 100 can have light sources including point light source, such as light emitting diode (LED), cathode-ray tube, etc, linear light source, or even flat panel light source. In the embodiment shown in FIG. 2, the light source module 100 is designed as an edge type light source module with LEDs as the light source 110 to work with a light guide plate 130 to generate a uniform light distribution. However, in other embodiments, the LEDs can be arranged in a matrix to serve as the light source of a direct type light source module, or the cathode ray tubes can be disposed at one side or at the bottom of the display panel to serve as the light source of a direct type or an edge type light source module.

As shown in FIG. 2, the open frame 300 is disposed around the light source module 100. In other words, the open frame 300 surrounds at least two sides of the light source module 100. The term 'open' frame 300 refers to a discontinuous frame. That is, the open frame 300 is discontinuous with intervals at some locations, and therefore, the open frame 300 is not a closed structure. As shown in FIG. 2, the open frame 300 has a first free-end 301 and a second free-end 302 formed on two outmost ends of the open frame 300, and a space interval is formed between the first free-end 301 and the second free-end 302. Because the first free-end 301 and the second free-end 302 are not connected to each other, the parts of the open frame 300 close to the first free-end 301 and the second free-end 302 are formed like cantilevers. As shown in FIG. 2, each part of the open frame 300 is coplanar with each other, and the space interval between the first free-end 301 and the second free-end 302 also extends on the plane. In other words, the extension direction of the space interval between the first free-end 301 and the second free-end 302 is coplanar with the open frame 300.

As for the embodiment shown in FIG. 2, the open frame 300 is distributed around three sides of the light source module 100 and forms a ⊓ shape. As shown in FIG. 2, the open frame 300 includes a first cantilever 310, a second cantilever 320, and a connecting arm 330. The first cantilever 310 and the second cantilever 320 extends perpendicularly from two ends of the connecting arm 330 in a same direction. Therefore, the first cantilever 310 and the second cantilever 320 are disposed in parallel on two opposite sides of the light source module 100. The first free-end 301 and the second free-end 302 are formed on the free-ends of the first cantilever 310 and the second cantilever 320, respectively. In this embodiment, the open frame 300 can be integrally formed by injection or any suitable methods. The material of the open frame 300 can be polyester, other plastics, or other castable materials.

Figure 3:
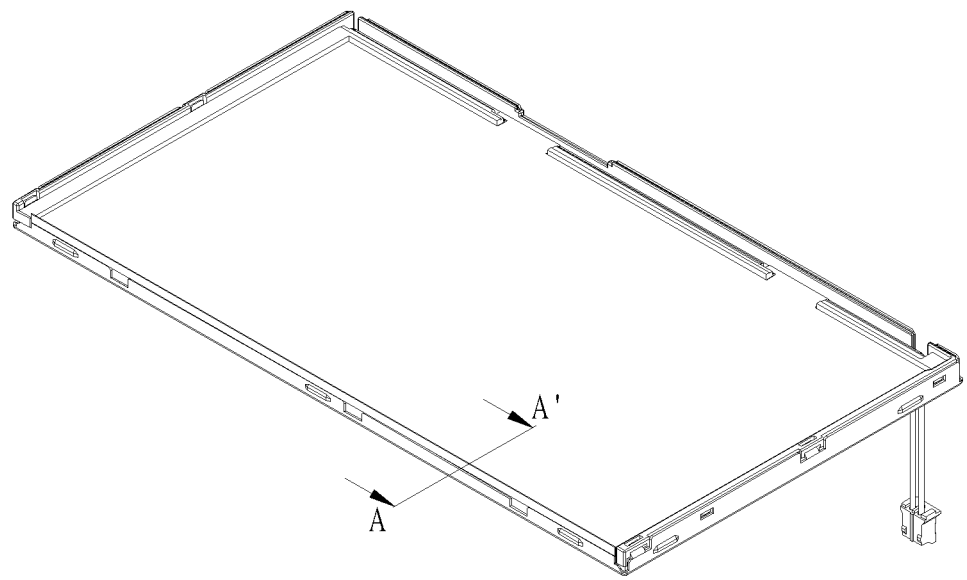
FIG. 3 is a cross-sectional view of an embodiment of a backlight module.
Figure 3:
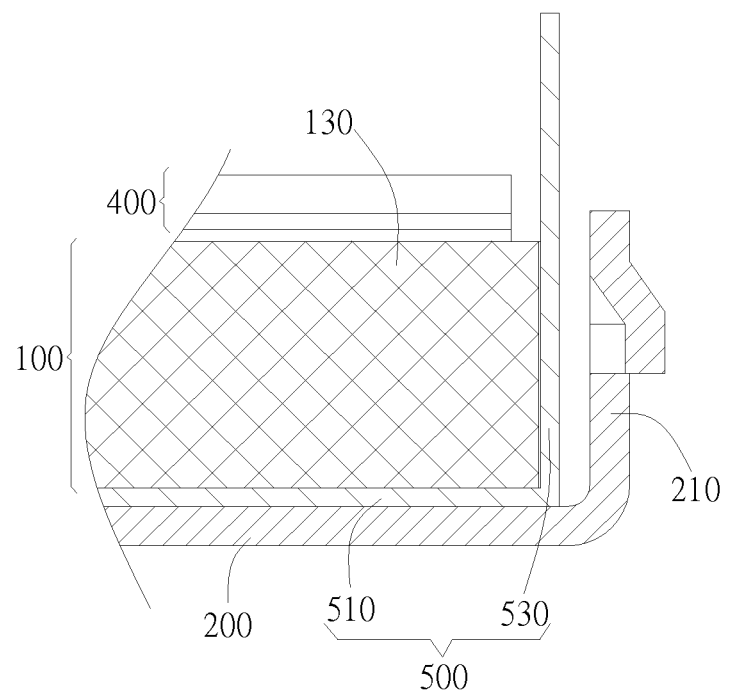

As shown in FIG. 2 and FIG. 3, the reflector sheet 500 is disposed on the rear side of the light source module 100. The reflector sheet 500 is preferably formed by polyethylene terephthalate (PET) or other plastics having white surface or other reflective surfaces. The reflector sheet 500 has a body 510 and a sidewall 530. The body 510 is disposed on the rear side of the light source module 100 and between the first cantilever 310 and the second cantilever 320. The sidewall 530 corresponds to the space interval between the first free-end 301 and the second free-end 302 of the open frame 300 and is bended from one end of the body 510 to extend over the light source module 100. No only the sidewall 530 is positioned directly between the first free-end 301 and the second free-end 302, but it also conforms to the definition that the sidewall 530 corresponds to the first free-end 301 and the second free-end 302 as the vertical projection of the sidewall 530 falls on a virtual line between the first free-end 301 and the second free-end 302.

With such a design, the volume and the size of the open frame 300 can be reduced and the required material of forming the open frame 300 can be decreased due to the elimination of a part of the open frame 300 on one side. Moreover, the arrangement of the sidewall 530 of the reflector sheet 500 can provide certain functions of the frame originally provided by the eliminated part between the first free-end 301 and the second free-end 302, so that the assembled backlight module still provides sufficient functions, such as insulation and buffer effects. As shown in FIG. 3, when the light source module 100 includes the light guide plate 130, the sidewall 530 of the reflector sheet 500 directly corresponds to the lateral side of the light guide plate 130 between the first free-end 301 and the second free-end 302. When the light is emitted from the lateral side of the light guide plate 130, the sidewall 530 of the reflector sheet 500 can reflect the light back into the light guide plate 130 to increase the usability of light.

As shown in FIG. 2 and FIG. 3, the backlight module further includes one or more optical films 400, such as diffusers and brightness enhancement films. The optical film 400 is disposed over the light source module 100. In this embodiment, the optical film 400 is directly disposed on the light guide plate 130. However, in another embodiment, the edge of the optical film 400 can also be supported by the open frame 300. As shown in FIG. 3, the top of the sidewall 530 of the reflector sheet 500 protrudes over the optical film 400. When assembled with a liquid crystal display panel (not shown), the part of the sidewall 530 protruding over the optical film 400 can be located on the lateral side of the liquid crystal display panel.

Figure 4:
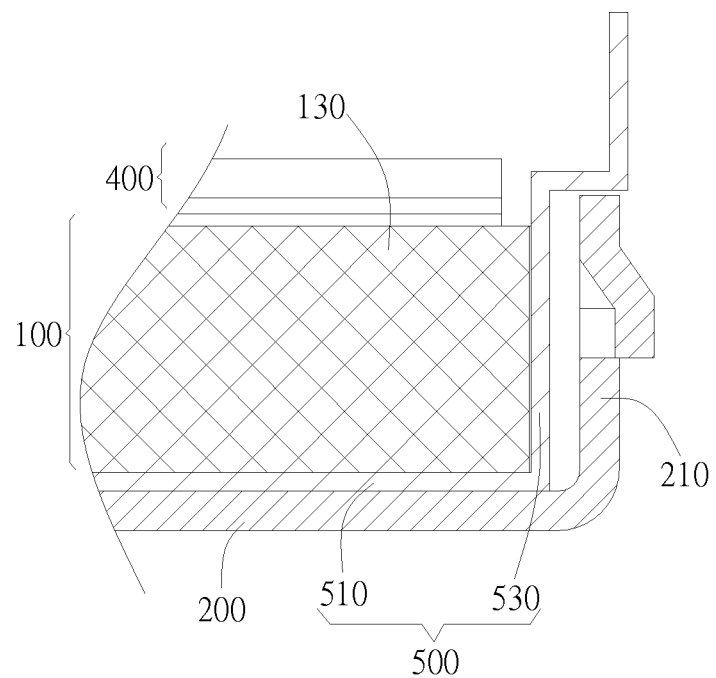
FIG. 4 is a cross-sectional view of another embodiment of a backlight module.

As shown in FIG. 2 and FIG. 3, the backlight module further includes a back plate 200. The back plate 200 is disposed on the rear side of the backlight module. The light source module 100, the open frame 300, and the reflector sheet 500 are all disposed on the back plate 200. The back plate 200 is formed with a back plate sidewall 210 on its periphery to surround the outside of the open frame 300. The sidewall 530 of the reflector sheet 500 is sandwiched between the light source module 100 and the open frame 300. The part of the sidewall 530 protruding between the light source module 100 and the back plate sidewall 210 directly protrudes upwards. However, in different embodiments, as shown in FIG. 4, the part of the sidewall 530 protruding between the light source module 100 and the back plate sidewall 210 can be bended outwards to extend over the top of the back plate sidewall 210, and then bended again in a direction away from the back plate sidewall 210.

Figure 5A:
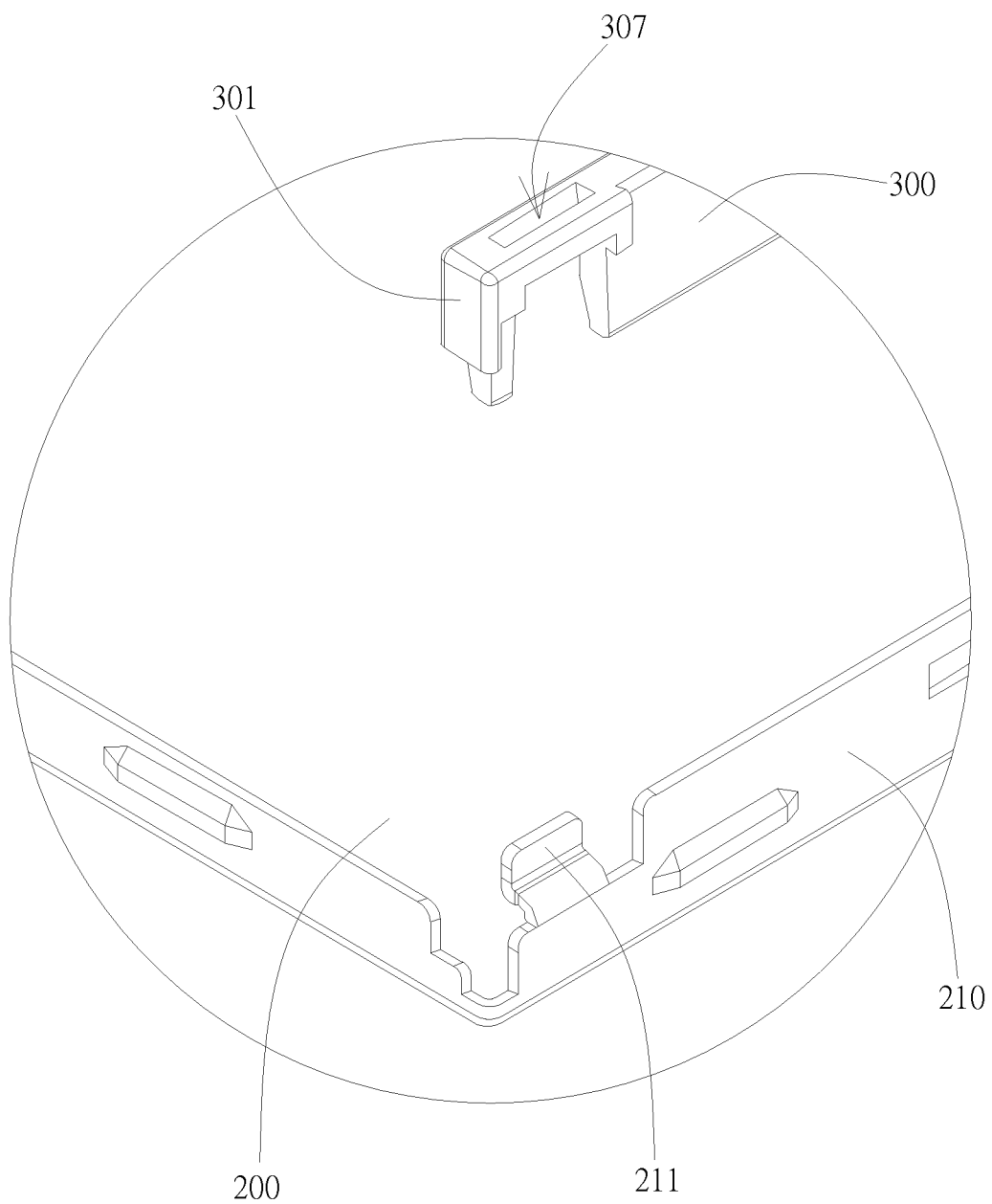
FIG. 5A schematically illustrates an embodiment showing an open frame connected to a back plate.
Figure 5B:
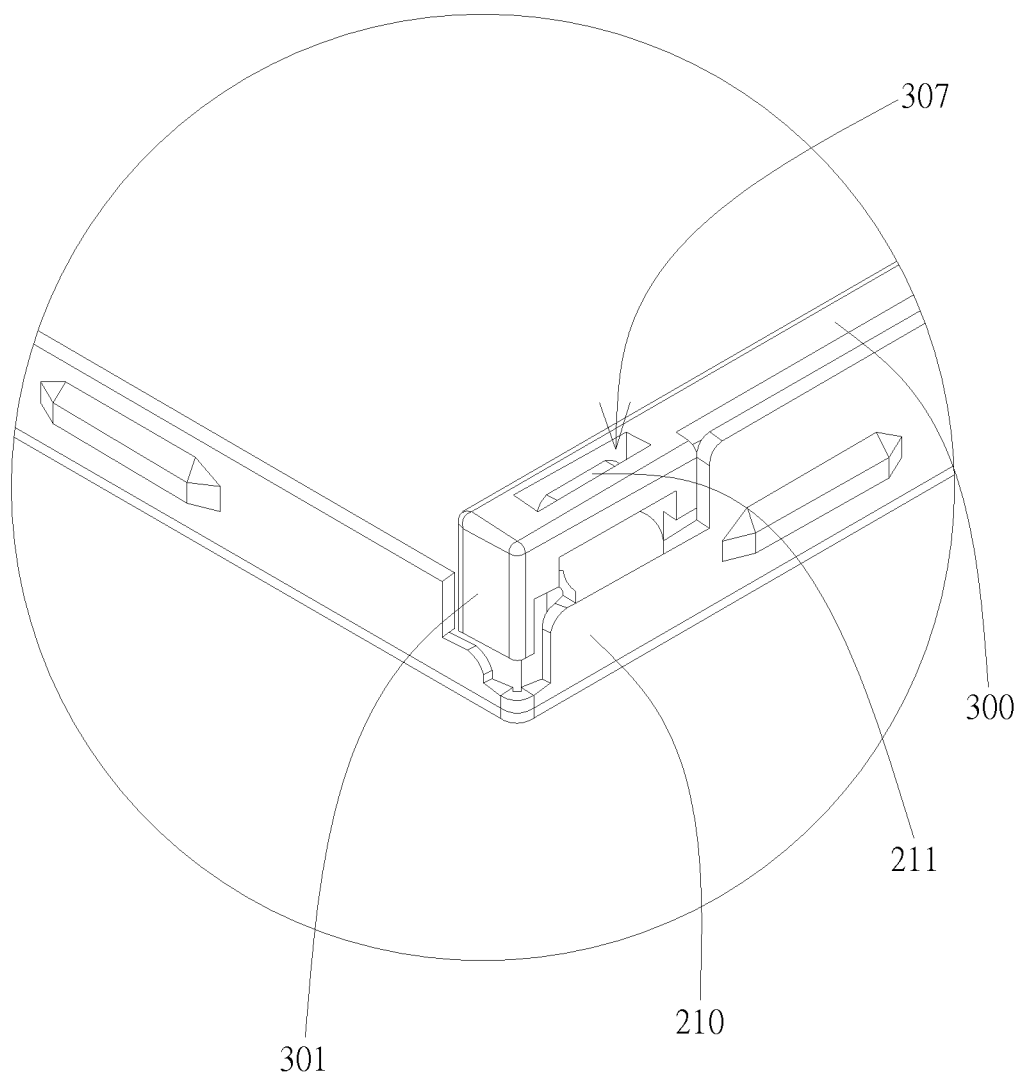
FIG. 5B is a schematic view of the embodiment of FIG. 5A after assembly.

The first free-end 301 and the second free-end 302 of the open frame 300 are preferably connected to corresponding positions of the back plate sidewall 210, respectively. The connection methods can include engaging, fitting, adhesion, locking, etc. With this connection feature, after assembly, the first free-end 301 and the second free-end 302 of the open frame 300 can be positioned on the back plate 200 to obtain a more stable structure and to enhance the structural strength. As shown in FIG. 5A, the back plate sidewall 210 has a tenon 211 corresponding to the first free-end 301 and a mortise 307 is formed on the first free-end 301 to engage with the tenon 211. As shown in FIG. 5B, when the tenon 211 is inserted into the mortise 307, the back plate sidewall 210 can provide the first free-end 301 with a supporting force to avoid relative movement therebetween. In other embodiments, the positions of the mortise 307 and the tenon 211 are interchangeable. Moreover, the second free-end 302 and the back plate sidewall 210 can also have a similar design.

Figure 6:
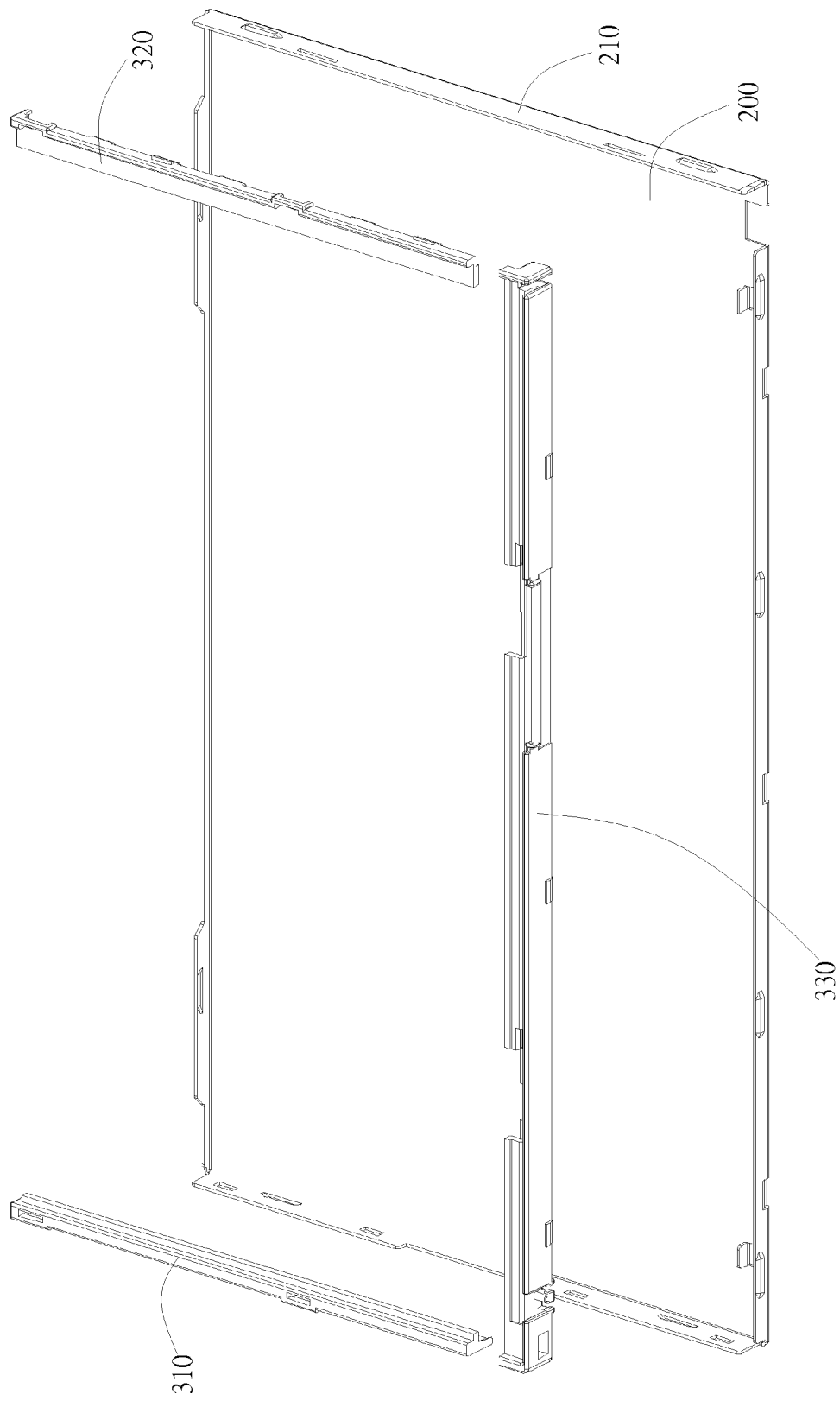
FIG. 6 schematically illustrates another embodiment of an open frame.

FIG. 6 illustrates another embodiment of a backlight module. In this embodiment, the three sides of the open frame 300, i.e., the first cantilever 310, the second cantilever 320, and the connecting arm 330, are separably connected. In other words, the first cantilever 310, the second cantilever 320, and the connecting arm 330 are formed as three independent bar structures and then assembled to form the open frame 300. The first cantilever 310, the second cantilever 320, and the connecting arm 330 can also be separately connected to the back plate 200 or the back plate sidewall 210 to form the open frame 300. With this separable design, users can have more selections of various designs.

Figure 7A:
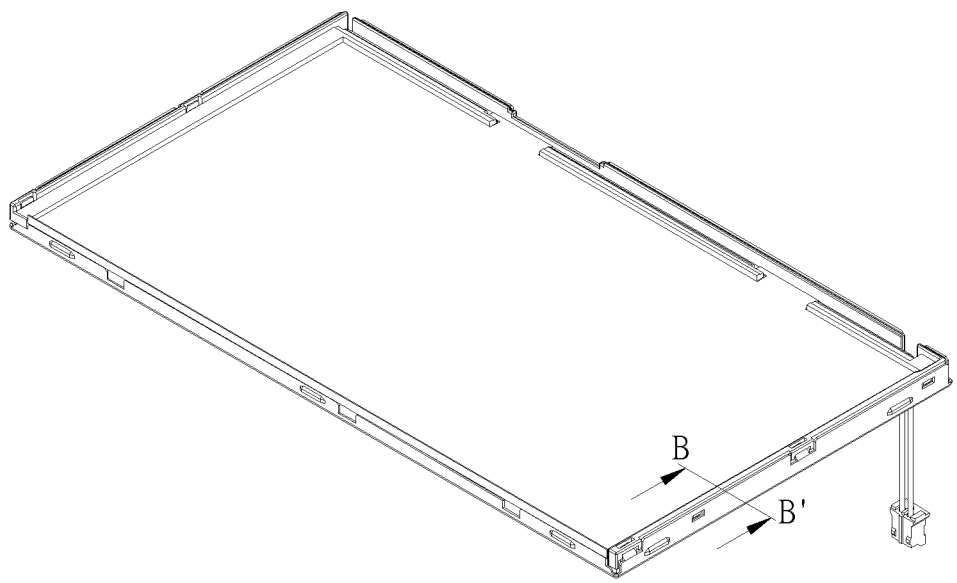
FIG. 7A is a cross-sectional view of an embodiment of a first cantilever, a reflector sheet, and a back plate.
Figure 7A:
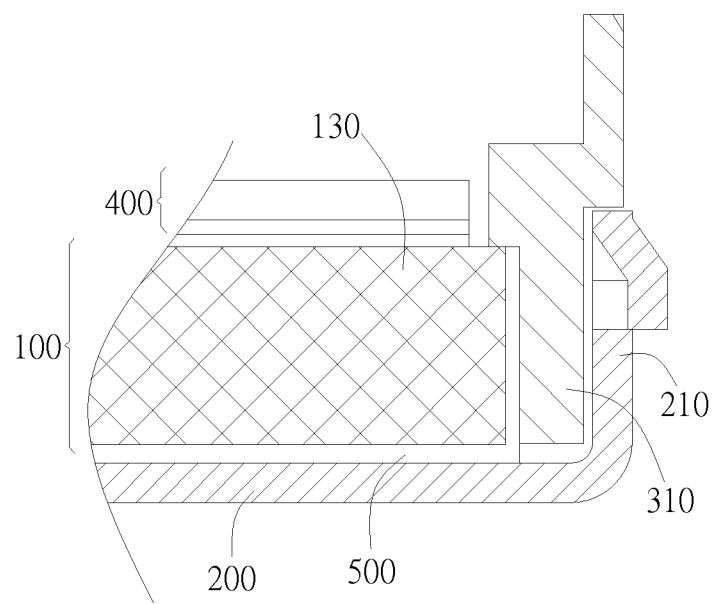
Figure 7B:
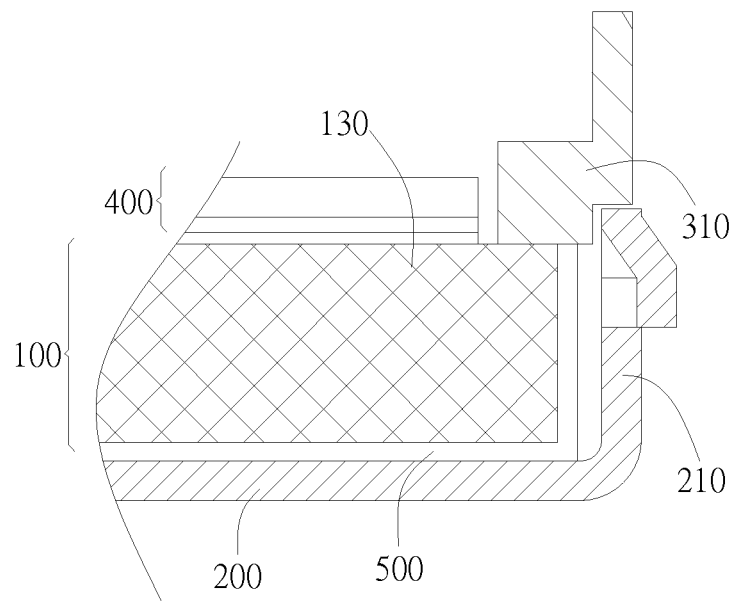
FIG. 7B is a cross-sectional view of another embodiment of a first cantilever, a reflector sheet, and a back plate.

FIG. 7A schematically illustrates a cross-sectional view of the first cantilever 310, the reflector sheet 500, and the back plate 200. As shown in FIG. 7A, the first cantilever 310 extends between the back plate 200 and the light module 100. However, in other embodiments, as shown in FIG. 7B, the first cantilever 310 can be located on the lateral side of the light exit surface of the light source module 100. Moreover, one end of the reflector sheet 500 corresponding to the first cantilever 310 can be bended to extend between the light source module 100 and the first cantilever 310 or between the light source module 100 and the back plate 200. When the light is emitted from the lateral side of the light source module 100, the bended part of the reflector sheet 500 can reflect the light to increase the usability of light. Likewise, one end of the reflector sheet 500 that corresponds to the connecting arm 330 can also be disposed in a similar way.

Figure 8:
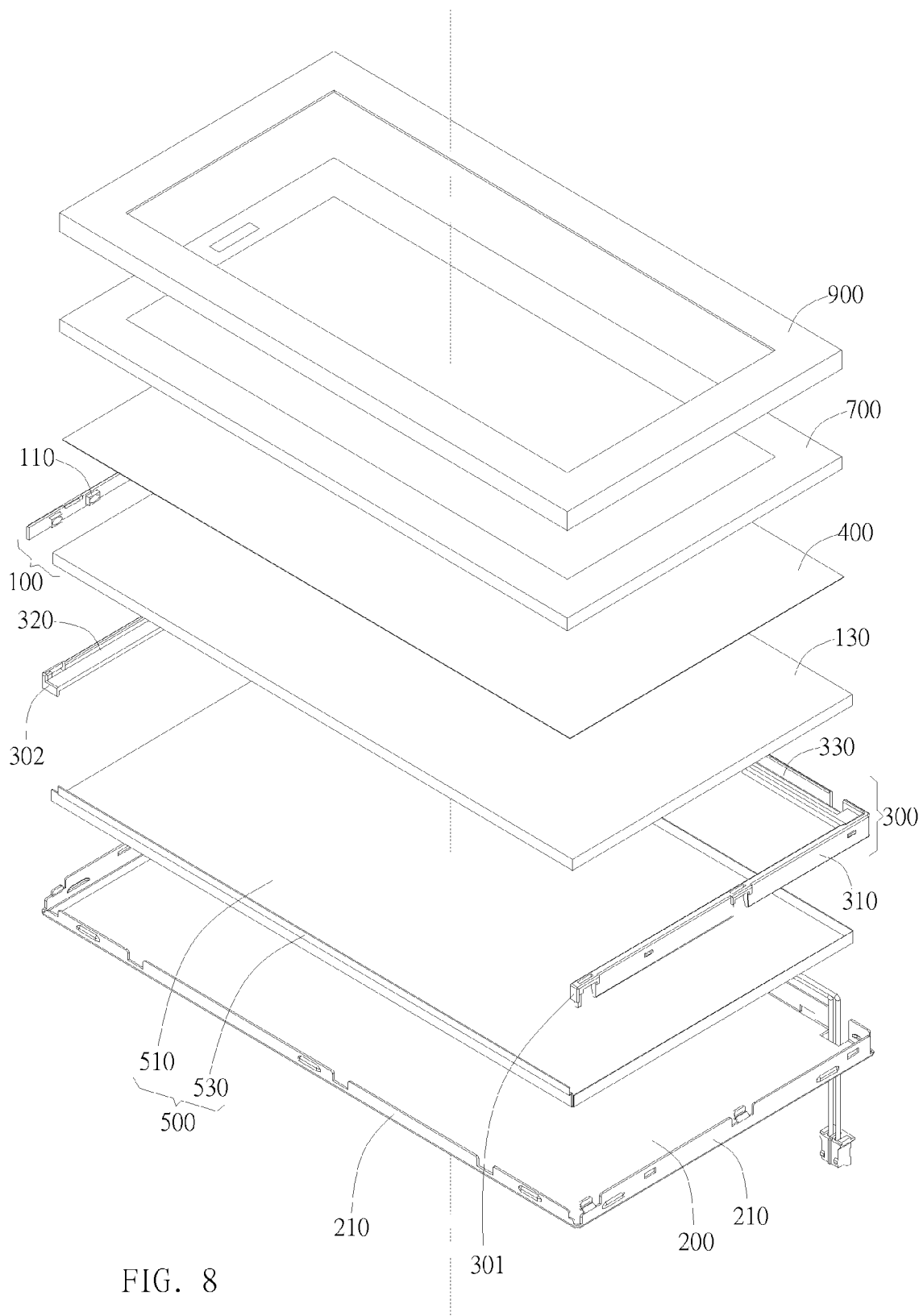
FIG. 8 schematically illustrates an embodiment of a panel display device of this invention.
Figure 9:
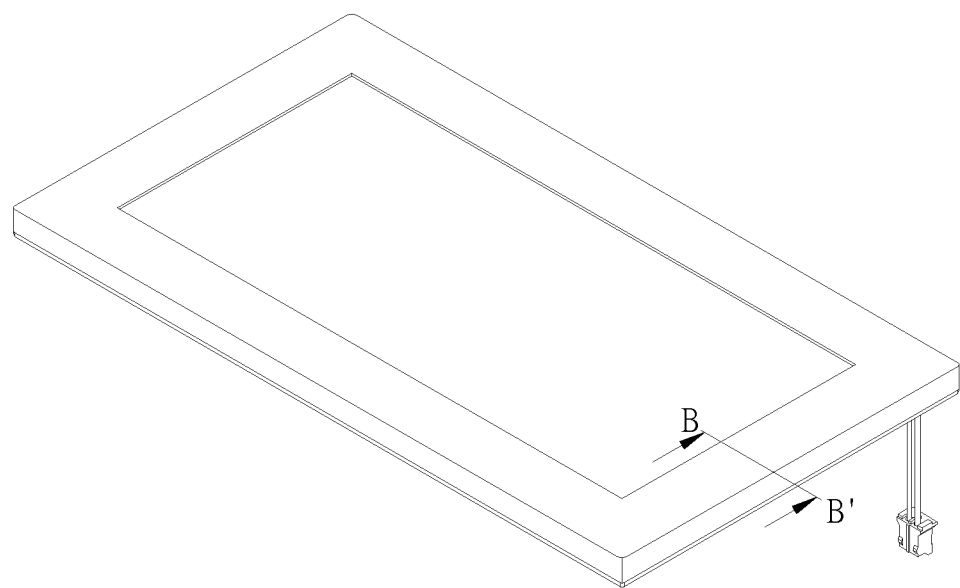
FIG. 9 is a cross-sectional view of an embodiment of a panel display device.
Figure 9:
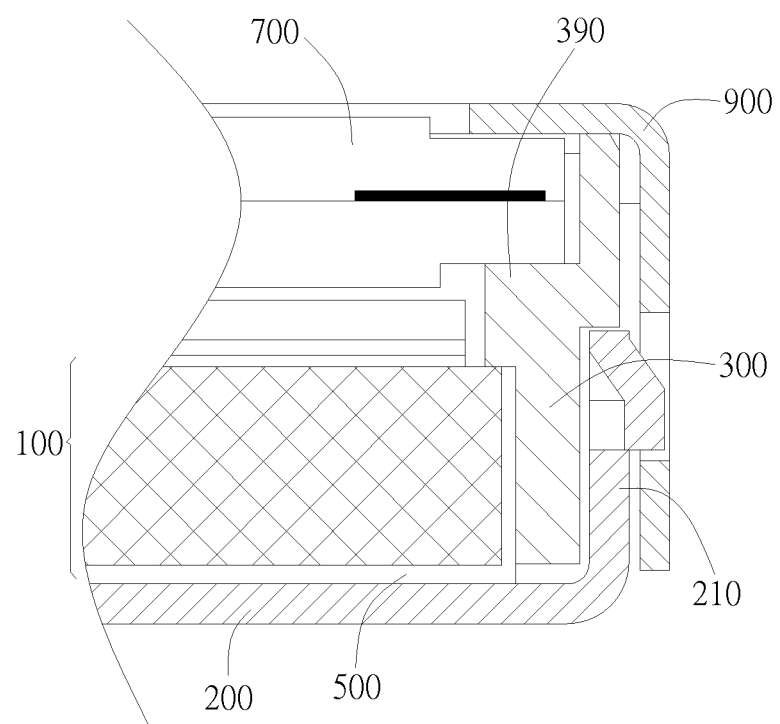

FIG. 8 is a schematic view of a panel display device of this invention. As shown in FIG. 8, the panel display device includes the backlight module described above, a liquid crystal display panel 700, and a front frame 900. The liquid crystal display panel 700 is disposed on the light source module 100 and supported by the open frame 300. As shown in FIG. 9, the open frame 300 is preferably equipped with a panel support 390 to support the edge of the liquid crystal display panel 700. The front frame 900 encloses the liquid crystal display panel 700 and exposes a display area of the liquid crystal display panel 700 to display images. The front frame 900 encloses the lateral side of the liquid crystal display panel 700 to provide protection to the liquid crystal display panel and enhance the exterior appearance of the liquid crystal display, even including the backlight module.

Figure 10:
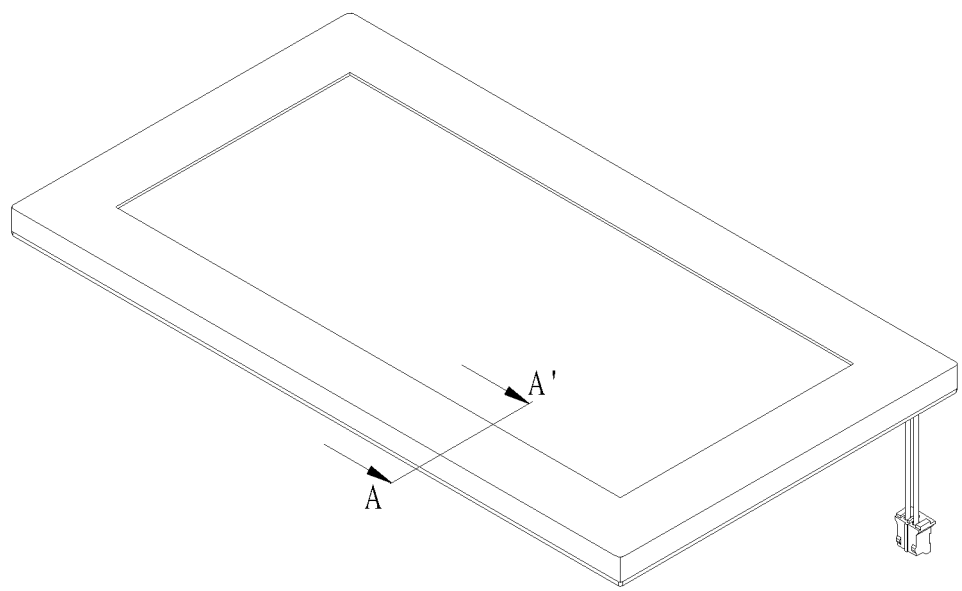
FIG. 10 is a cross-sectional view of an embodiment of a panel display device from different viewing angle.
Figure 10:
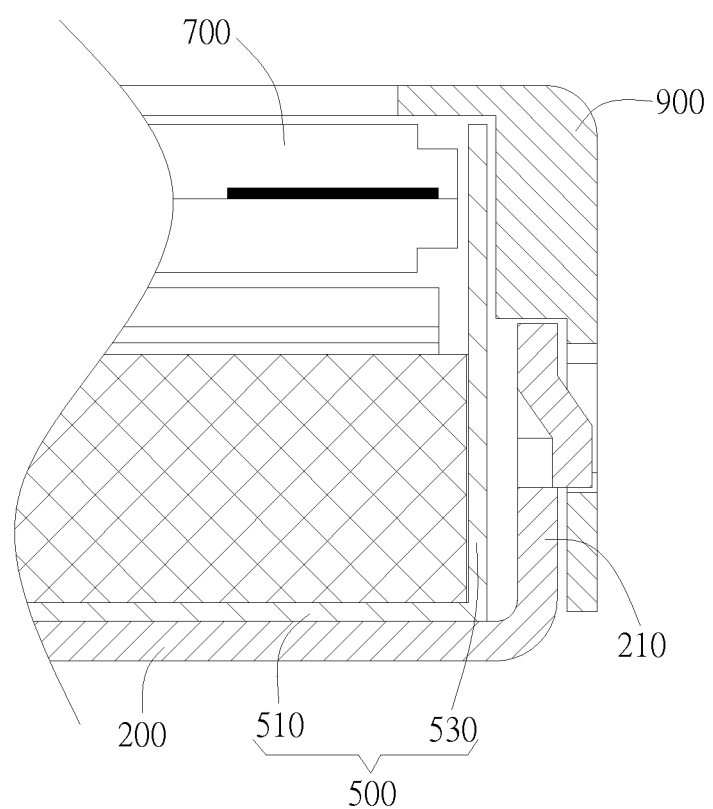

As shown in FIG. 10, the sidewall 530 of the reflector sheet 500 extends between the lateral side of the liquid crystal display panel 700 and the front frame 900 to provide insulation between the liquid crystal display panel 700 and the front frame 900. Meanwhile, by referring to the different cross-sectional view of FIG. 9, it can be seen that the sidewall 530 protrudes over the panel support 390. With this design, the insulation effect originally provided by the frame body of the backlight module can be replaced by the reflector sheet 500 to avoid short circuit caused by direct contact between the liquid crystal display panel 700 and the front frame 900. Therefore, the employment of the open frame 300 can reduce the overall size and save the material cost.

Figure 11:
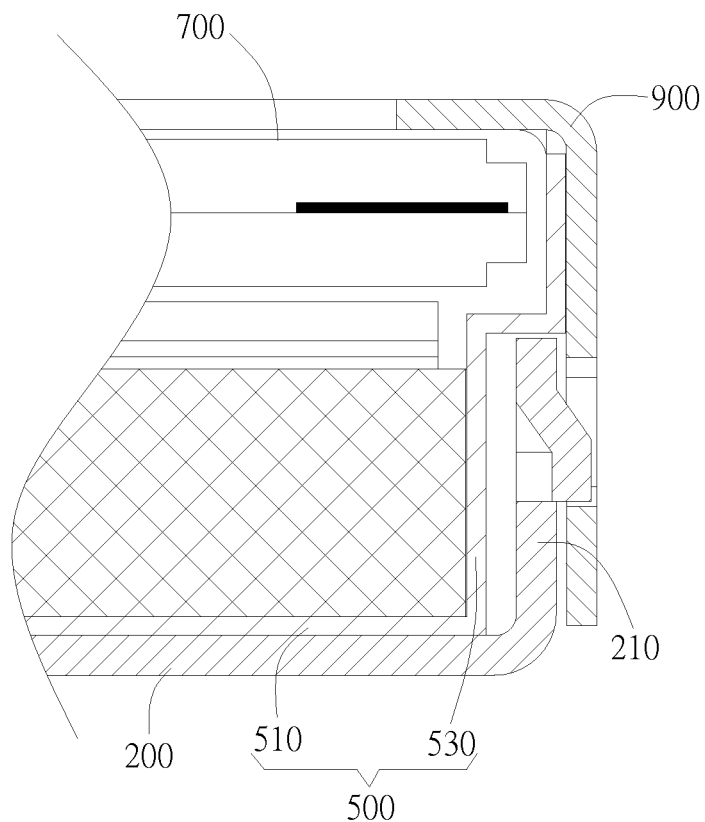
FIG. 11 is a cross-sectional view of another embodiment of a panel display device.

In the embodiment of FIG. 11, the sidewall 530 of the reflector sheet 500 is sandwiched between the light source module 100 and the open frame 300. Moreover, the part of the sidewall 530 that protrudes between the light source module 100 and the back plate sidewall 210 is bended outwards to extend above the top of the back plate sidewall 210, and then bended again to extend between the front frame 900 and the lateral side of the liquid crystal display panel 700. Therefore, the size of the backlight module can be further reduced and the accommodation space of the liquid crystal display panel 700 can be increased without affecting the size.

This invention is described with the embodiments above; however, the embodiments above are only exemplary. What needs to be pointed out is that the disclosed embodiments do not limit the scope of this invention. Contrarily, the modifications and equivalents included in the spirit and scope of the claims are all included in the scope of this invention.

What is claimed is:

1. A backlight module, comprising:
a light source module, comprising a light guide plate and a light source;
an open frame, disposed around lateral sides of the light source module, having a first free-end and a second free-end, wherein a space interval is formed between the first free-end and the second free-end, an extension direction of the space interval between the first free-end and the second free-end is coplanar with the open frame;
a reflector sheet, disposed on a rear side of the light source module, having a body and a sidewall, wherein the sidewall corresponds to the space interval between the first free-end and the second free-end of the open frame and is bent from one end of the body to extend over the light source module; the sidewall of the reflector sheet also corresponds to a lateral side of the light guide plate between the first free-end and the second free-end directly and reflects the light emitted from the lateral side of the light guide plate, wherein the light source is disposed at a lateral side of the light guide plate and no light source is disposed between the sidewall of the reflector sheet and the light guide plate; and
a back plate, wherein the light source module, the open frame, and the reflector sheet are disposed on the back plate, the back plate has a back plate sidewall, and the first free-end and the second free-end of the open frame are connected to the back plate sidewall, respectively.

2. The backlight module of claim 1, further comprising at least one optical film disposed on a light exit surface of the light source module, wherein a top of the sidewall of the reflector sheet protrudes over the optical film.

3. The backlight module of claim 1, wherein the open frame has a panel support disposed opposite to the reflector sheet with respect to the light source module, a top of the sidewall of the reflector sheet protrudes over the panel support.

4. The backlight module of claim 1, wherein the sidewall of the reflector sheet is at least partially sandwiched between the light source module and a portion of the back plate sidewall corresponding to the space interval between the first free-end and the second free-end and is bent outwards to extend above a top of the back plate sidewall, and then bent to extend away from the back plate sidewall.

5. The backlight module of claim 1, wherein the back plate sidewall includes at least one tenon respectively corresponding to each of the first free-end and the second free-end, and each of the first free-end and the second free-end respectively has a mortise for engaging with the at least one tenon.

6. The backlight module of claim 1, wherein the open frame includes a first cantilever, a second cantilever, and a connecting arm, the first cantilever and the second cantilever extend perpendicularly from two ends of the connecting arm in a same direction, the first free-end and the second free-end are formed on the ends of the first cantilever and the second cantilever away from the connecting arm, respectively.

7. The backlight module of claim 6, wherein the first cantilever and the second cantilever are separably connected to the two ends of the connecting arm, respectively.

8. The backlight module of claim 6, wherein one end of the reflector sheet corresponding to the first cantilever or the connecting arm is bent to extend between the first cantilever and the light source module or between the connecting arm and the light source module.

9. A panel display device, comprising:
a backlight module, including:
a light source module, comprising a light guide plate and a light source;
an open frame, disposed around lateral sides of the light source module, having a first free-end and a second free-end; wherein a space interval is formed between the first free-end and the second free-end, and an extension direction of the space interval between the first free-end and the second free-end is co-planar with open frame;
a reflector sheet, disposed on a rear side of the light source module, having a body and a sidewall, wherein the sidewall corresponds to the space interval between the first free-end and the second free-end of the open frame and is bent from one end of the body to extend over the light source module; the sidewall of the reflector sheet also corresponds to a lateral side of the light guide plate between the first free-end and the second free-end directly and reflects the light emitted from the lateral side of the light guide plate, wherein the light source is disposed at a lateral side of the light guide plate and no light source is disposed between the sidewall of the reflector sheet and the light guide plate; and
a back plate, wherein the light source module, the open frame, and the reflector sheet are disposed on the back plate, the back plate has a back plate sidewall, and the first free-end and the second free-end of the open frame are connected to the back plate sidewall, respectively;
a liquid crystal display panel, disposed on the light source module and supported by the open frame; and
a front frame, covering the liquid crystal display panel and surrounding lateral sides of the liquid crystal display panel, wherein the sidewall of the reflector sheet extends between the lateral side of the liquid crystal display panel and the front frame to provide insulation.

10. The panel display device of claim 9, wherein the open frame has a panel support disposed opposite to the reflector sheet with respect to the light source module, and a top of the sidewall of the reflector sheet protrudes over the panel support.

11. The panel display device of claim 9, wherein the sidewall of the reflector sheet is at least partially sandwiched between the light source module and a portion of the back plate sidewall corresponding to the space interval between the first free-end and the second free-end, and a part of the sidewall away from the body is bent to extend above a top of the back plate sidewall, and then bent to extend between the front frame and the liquid crystal display panel.

12. The panel display device of claim 9, wherein the back plate sidewall includes at least one tenon respectively corresponding to each of the first free-end and the second free-end, and the first free-end and the second free-end respectively has a mortise for engaging with the at least one tenon.

13. The panel display device of claim 9, wherein the open frame includes a first cantilever, a second cantilever, and a connecting arm, the first cantilever and the second cantilever extend perpendicularly from two ends of the connecting arm in a same direction, the first free-end and the second free-end are formed on the ends of the first cantilever and the second cantilever away from the connecting arm, respectively.

14. The panel display device of claim 13, wherein the first cantilever and the second cantilever are separably connected to the two ends of the connecting arm, respectively.

15. The panel display device of claim 13, wherein two ends of the reflector sheet respectively corresponding to the first cantilever and the second cantilever are bent to extend between the first cantilever and the light source module and between the second cantilever and the light source module.

16. A backlight module, comprising:
a light source module, comprising a light guide plate and a light source;
an open frame, disposed around lateral sides of the light source module, having a first free-end and a second free-end, wherein a space interval is formed between the first free-end and the second free-end, an extension direction of the space interval between the first free-end and the second free-end is coplanar with the open frame;
a reflector sheet, disposed on a rear side of the light source module, having a body and a sidewall, wherein the sidewall corresponds to the space interval between the first free-end and the second free-end of the open frame and is bent from one end of the body to extend over the light source module; the sidewall of the reflector sheet also corresponds to a lateral side of the light guide plate between the first free-end and the second free-end directly and reflects the light emitted from the lateral side of the light guide plate, wherein the light source is disposed only at a lateral side of the light guide plate other than the lateral side having the sidewall of the reflector sheet corresponding to; and
a back plate, wherein the light source module, the open frame, and the reflector sheet are disposed on the back plate, the back plate has a back plate sidewall, and the first free-end and the second free-end of the open frame are connected to the back plate sidewall, respectively.

* * * * *